United States Patent
Liu et al.

(10) Patent No.: US 9,811,517 B2
(45) Date of Patent: *Nov. 7, 2017

(54) METHOD AND SYSTEM OF ADDING PUNCTUATION AND ESTABLISHING LANGUAGE MODEL USING A PUNCTUATION WEIGHTING APPLIED TO CHINESE SPEECH RECOGNIZED TEXT

(71) Applicant: Tencent Technology (Shenzhen) Company Limited, Shenzhen (CN)

(72) Inventors: Haibo Liu, Shenzhen (CN); Eryu Wang, Shenzhen (CN); Xiang Zhang, Shenzhen (CN); Li Lu, Shenzhen (CN); Shuai Yue, Shenzhen (CN); Qiuge Liu, Shenzhen (CN); Bo Chen, Shenzhen (CN); Jian Liu, Shenzhen (CN); Lu Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 356 days.

This patent is subject to a terminal disclaimer.

(21) Appl. No.: 14/148,579

(22) Filed: Jan. 6, 2014

(65) Prior Publication Data
US 2014/0214406 A1 Jul. 31, 2014

Related U.S. Application Data

(63) Continuation of application No. PCT/CN2013/086618, filed on Nov. 6, 2013.

(30) Foreign Application Priority Data

Jan. 29, 2013 (CN) .......................... 2013 1 0034265

(51) Int. Cl.
*G06F 17/27* (2006.01)
*G06F 17/28* (2006.01)
(Continued)

(52) U.S. Cl.
CPC ........ *G06F 17/273* (2013.01); *G06F 17/2775* (2013.01); *G06F 17/2785* (2013.01); *G06F 17/289* (2013.01); *G10L 15/265* (2013.01)

(58) Field of Classification Search
CPC ... G10L 15/18; G10L 15/265; G06F 17/2818; G06F 17/277; G06F 17/2785; G06F 17/289
(Continued)

(56) References Cited

U.S. PATENT DOCUMENTS

| 5,146,405 A | 9/1992 | Church |
| 5,802,534 A * | 9/1998 | Hatayama ............... G06F 17/24 715/205 |

(Continued)

FOREIGN PATENT DOCUMENTS

| CN | 1235312 A | 11/1999 |
| CN | 1560834 A | 1/2005 |

(Continued)

OTHER PUBLICATIONS

Tencent Technology, ISR, PCT/CN2013/086618, Feb. 20, 2014, 6 pgs.
(Continued)

*Primary Examiner* — Farzad Kazeminezhad
(74) *Attorney, Agent, or Firm* — Morgan, Lewis & Bockius LLP

(57) ABSTRACT

A method of processing information content based on a Chinese language model is performed at a computer, the method including: identifying a plurality of expressions in the information content extracted from a speech input
(Continued)

through speech recognition that is queued to be processed; dividing the expressions into a plurality of characteristic units according to semantic features and predetermined characteristics associated with each characteristic unit, each including a subset of the expressions and the predetermined characteristics at least including a respective integer number of expressions that are included in the characteristic unit; extracting, from the Chinese language model, a plurality of probabilities for punctuation marks associated with each characteristic unit; and in accordance with the probabilities, associating a respective punctuation mark with each characteristic unit included in the information content. The method further comprises adding punctuation marks based on a weight determined for each punctuation mark.

16 Claims, 3 Drawing Sheets

(51) Int. Cl.
  *G10L 15/00* (2013.01)
  *G10L 15/26* (2006.01)
(58) Field of Classification Search
  USPC .................................................. 704/9, 235, 2
  See application file for complete search history.

(56) References Cited

U.S. PATENT DOCUMENTS

| | | | |
|---|---|---|---|
| 6,067,514 | A * | 5/2000 | Chen ...................... G10L 15/18 |
| | | | 704/235 |
| 6,173,261 | B1 | 1/2001 | Arai et al. |
| 8,612,204 | B1 * | 12/2013 | Uszkoreit ........... G06F 17/2818 |
| | | | 704/2 |
| 2004/0262663 | A1 | 12/2004 | Lin et al. |
| 2006/0080309 | A1 | 4/2006 | Yacoub et al. |
| 2009/0281791 | A1 * | 11/2009 | Li ......................... G06F 17/277 |
| | | | 704/9 |
| 2010/0121639 | A1 | 5/2010 | Zweig |
| 2010/0241429 | A1 | 9/2010 | Siminoff |

FOREIGN PATENT DOCUMENTS

| | | |
|---|---|---|
| CN | 1945693 A | 4/2007 |
| CN | 102231278 A | 11/2011 |
| EP | 2387033 A1 | 11/2011 |
| JP | H05314168 A | 11/1993 |
| WO | WO 2004003887 A2 | 1/2004 |

OTHER PUBLICATIONS

Tencent Technology, IPRP, PCT/CN2013/086618, Aug. 4, 2015, 11 pgs.

* cited by examiner

METHOD AND SYSTEM OF ADDING PUNCTUATION AND ESTABLISHING LANGUAGE MODEL USING A PUNCTUATION WEIGHTING APPLIED TO CHINESE SPEECH RECOGNIZED TEXT

RELATED APPLICATIONS

This application is a continuation application of PCT Patent Application No. PCT/CN2013/086618, entitled "METHOD AND SYSTEM OF ADDING PUNCTUATION AND ESTABLISHING LANGUAGE MODEL" filed Nov. 6, 2013, which claims priority to Chinese Patent Application No. 201310034265.9, "METHOD, SYSTEM OF ADDING PUNCTUATION AND ESTABLISHMENT METHOD, DEVICE OF ITS LANGUAGE MODEL," filed Jan. 29, 2013, both of which are hereby incorporated by reference in their entirety.

FIELD OF THE INVENTION

The present invention relates to the field of information processing technology, especially relates to method and system of adding punctuation and establishing language model.

BACKGROUND OF THE INVENTION

In the fields of communication and the Internet, it is needed to add punctuation for some documents short of punctuation in some application scenarios, for example, adding punctuation for speech documents.

On adding punctuation for speech documents, conventionally, there exists a kind of scheme; it is based on the mute interval when the speaker is speaking to automatically add punctuation.

Concretely, setting the threshold value of the length of mute first, if the length of mute interval when the speaker is speaking is bigger than the threshold value, adding punctuation at this place, if it is not bigger than the mentioned threshold value, not adding punctuation.

Simply relying on the interval threshold value when the speaker is speaking to add punctuation may excessively result in wrong punctuation adding, wrong pauses of sentences and so on, for example, if the speaking speed of the speaker is fast, there is no interval or the interval is so short that it is less than the threshold value, there is no punctuation added in the whole passage, if the speaking speed of the speaker is slow, approaching speaking out sentences with cruel intervals after each character, the whole passage will have a lot of punctuation, these two kinds of situations will result in wrong punctuation adding, low accuracy of punctuation adding.

Aiming at the question of low accuracy existing in the scheme of adding punctuation for speech documents based on the threshold value of the length of mute, there is a kind of improved scheme of punctuation adding based on hyphenation processing and the place of each character.

In the mentioned improved scheme, conducting hyphenation processing to the sentences in corpus first, after dividing the sentences to be processed into each character, determining the place of each character in the sentences, namely at the beginning, in the middle or at the end of sentences, and determining the situation of punctuation after each character, for example, whether there is punctuation or not and so on, establishing language model according to the place of each character in the corpus and the situation of punctuation after each character, using the established language model to add punctuation to the sentences to be processed.

In the mentioned improved scheme, it uses the place of single character in the sentences and whether there is punctuation after single character or not to establish language model, due to the information used is limited, and the information used and the status of punctuation are not closely associated, the established language model cannot extract out the real relationship between the information of sentences and the punctuation status of sentences.

Due to the language model used in the mentioned improved scheme does not extract out the real relationship between the information of sentences and the punctuation status of sentences, the accuracy of punctuation adding is low as well.

SUMMARY

The above deficiencies and other problems associated with the conventional approach of adding punctuation marks to a document are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method of processing information content based on a language model is performed by a computer having one or more processors and memory. The computer-implemented method includes: identifying a plurality of expressions in the information content that is queued to be processed; dividing the plurality of expressions into a plurality of characteristic units according to semantic features and predetermined characteristics associated with each of the plurality of characteristic units, each characteristic unit including a subset of the plurality of expressions and the predetermined characteristics at least including a respective integer number of expressions that are included in the characteristic unit; extracting, from the language model, a plurality of probabilities for a plurality of punctuation marks associated with each of the plurality of characteristic units; and in accordance with the extracted probabilities, associating a respective punctuation mark with each of the plurality of characteristic units included in the information content.

Another aspect of the invention involves a computer-implemented method of establishing a language model from training information content is performed by a computer having one or more processors and memory. The computer-implemented method includes: identifying, within the training information content, a plurality of expressions, wherein the plurality of expressions are separated and grouped by a plurality of punctuation marks that are located at predetermined locations in the training information content; dividing the plurality of expressions into a plurality of characteristic units according to semantic features and predetermined characteristics of each characteristic unit in the plurality of characteristic units, each characteristic unit including a respective subset of expressions; recording a respective frequency of occurrence for each of the plurality of punctuation marks that follow each of the plurality of characteristic units in the training information content; and establishing the language model based on a plurality of frequencies of occurrence of the plurality of punctuation marks, further including the recorded respective frequency of occurrence, for the plurality of punctuation marks that follow each of the plurality of characteristic units, wherein in accordance with the language model, the plurality of probabilities for the plurality of punctuation marks are used to determine a punctuation mark for a corresponding characteristic unit included in certain information content that is not yet segmented by punctuation marks.

Another aspect of the invention involves a computer system. The computer system includes memory, one or more processors, and one or more programs stored in the memory and configured for execution by the one or more processors. The one or more programs include: identifying a plurality of expressions in the information content that is queued to be processed; dividing the plurality of expressions into a plurality of characteristic units according to semantic features and predetermined characteristics associated with each of the plurality of characteristic units, each characteristic unit including a subset of the plurality of expressions and the predetermined characteristics at least including a respective integer number of expressions that are included in the characteristic unit; extracting, from the language model, a plurality of probabilities for a plurality of punctuation marks associated with each of the plurality of characteristic units; and in accordance with the extracted probabilities, associating a respective punctuation mark with each of the plurality of characteristic units included in the information content.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
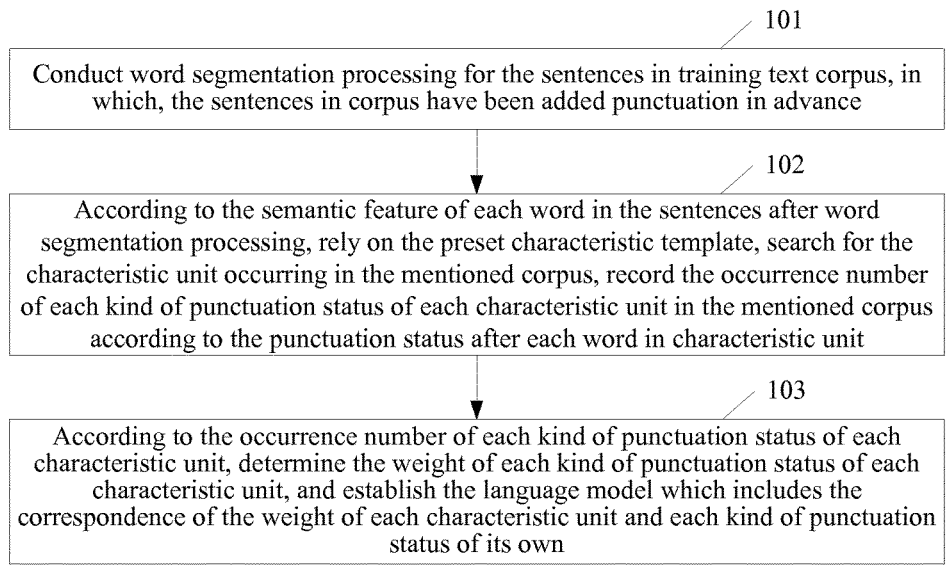
FIG. 1 is a first flowchart diagram of the method of establishing a language model used for adding punctuation according to some embodiments.

FIG. 1 is the first flowchart diagram of the method of establishing a language model used for adding punctuation according to some embodiments.

As shown in FIG. 1, this first flowchart diagram includes:

Step 101, conducting word segmentation processing for the sentences in corpus, in which, the sentences in corpus have been added punctuation in advance.

Step 102, according to the semantic feature of each word in the sentences after word segmentation processing, relying on the preset characteristic template, searching for the characteristic unit occurring in the mentioned corpus, recording the occurrence number of each kind of punctuation status of each characteristic unit in the mentioned corpus according to the punctuation status after each word in characteristic unit.

Step 103, according to the occurrence number of each kind of punctuation status of each characteristic unit, determining the weight of each kind of punctuation status of each characteristic unit, establishing the language model of the correspondence of the weight of each characteristic unit and each kind of punctuation status of its own.

In which, the mentioned language model is used for providing the correspondence of the weight of each characteristic unit and each kind of punctuation status of its own in the mentioned language model according to the search request when searching out the characteristic unit from the sentences short of punctuation, so as to depend on the mentioned correspondence to add punctuation to the sentences short of punctuation.

In the Step 102 of the method shown in FIG. 1, it can adopt Method 1, namely labeling the semantic feature and punctuation status of each word in the sentences of the mentioned corpus in advance, and then searching the characteristic unit occurring in the mentioned corpus according to the preset characteristic template, and recording the occurrence number of each kind of punctuation status of each characteristic unit. It can also adopt Method 2, namely when searching the characteristic unit occurring in corpus according to the preset characteristic template, recognizing the semantic feature of each word and the punctuation status after each word in sentences in real-time. Now, further introduce the method shown in FIG. 1 in detail with the example of realizing Step 102 by using the mentioned Method 1, referring to FIG. 2 for more information.

Figure 2:
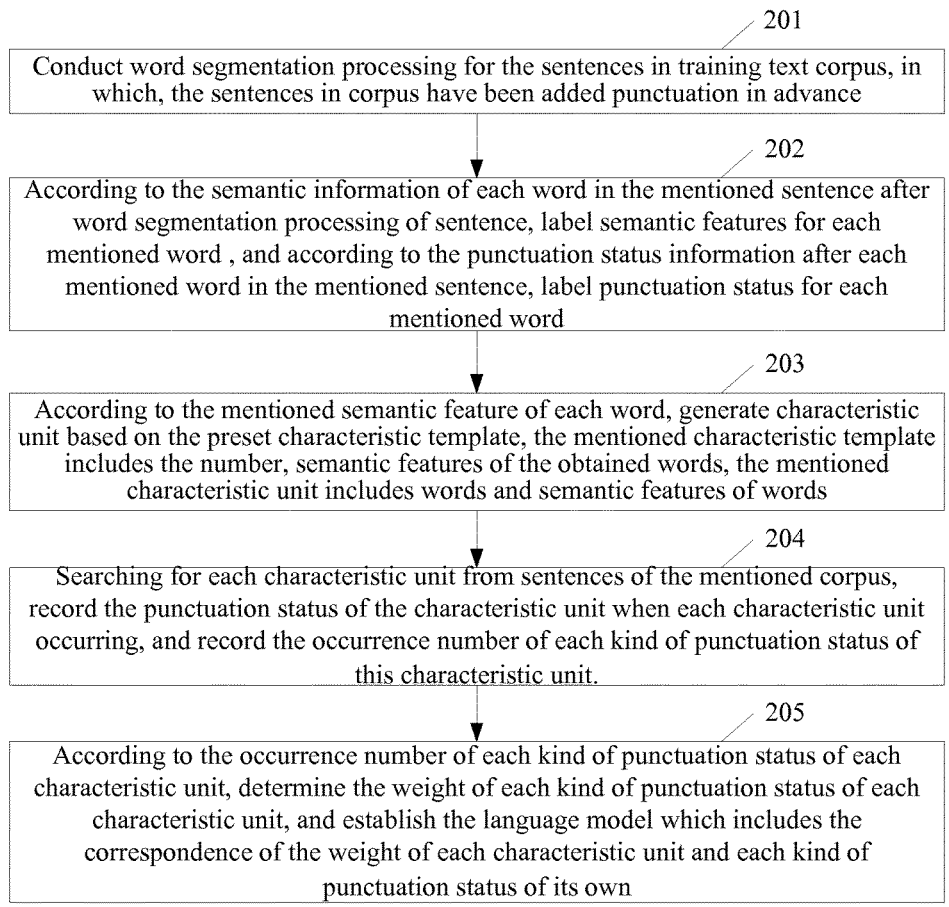
FIG. 2 is a second flowchart diagram of the method of establishing a language model used for adding punctuation according to some embodiments.

FIG. 2 is the second flowchart diagram of the method of establishing a language model used for adding punctuation according to some embodiments.

As is shown in FIG. 2, the method includes:

Step 201, conducting word segmentation processing for the sentences in corpus, in which, the sentences in corpus have been added punctuation in advance.

Step 202, according to the semantic information of each word of the sentences after word segmentation processing in the mentioned sentences, labeling semantic feature for each of the mentioned word, according to the punctuation status information after each of the mentioned word in the mentioned sentences, labeling punctuation status for each of the mentioned word.

Step 203, according to the mentioned semantic feature of each word, generating characteristic unit based on the preset characteristic template, the mentioned characteristic template includes the number, semantic features of the obtained words, the mentioned characteristic unit includes words and semantic features of words.

Step 204, searching for each characteristic unit from sentences of the mentioned corpus, recording the punctuation status of the characteristic unit when each characteristic unit occurring, recording the occurrence number of each kind of punctuation status of this characteristic unit, among which, the punctuation status of the characteristic unit includes the punctuation status of each word in this characteristic unit.

Step 205, according to the occurrence number of each kind of punctuation status of each characteristic unit, determining the weight of each kind of punctuation status of each characteristic unit, establishing the language model of the correspondence of the weight of each characteristic unit and each kind of punctuation status of its own.

In which, the mentioned language model is used for returning the correspondence of the weight of each characteristic unit and each kind of punctuation status of its own in the mentioned language model according to the calling request when searching out the characteristic unit from the sentences short of punctuation, so as to depend on the mentioned correspondence to add punctuation to the sentences short of punctuation.

In order to improve the quality of the established language model, the accuracy of the pre-added punctuation in sentences of the mentioned corpus shall be higher, it is better that all the punctuations are accurate.

In the flow shown in FIG. 2, Step 203 and Step 204 can be realized in one process, for example, according to the preset characteristic template, extract characteristic unit from the sentences of corpus, if the extracted characteristic unit does not occurred before, it is equivalent to the generation of a new characteristic unit, and the frequency of searching out this new characteristic unit from the sentences of corpus is one.

On the basis of extracting characteristic units according to the semantic features of the words in sentences, the position information of words can be further used, the position information of the mentioned words is the relative position information of words and the current reference position, except for words, the semantic features of words, the extracted characteristic unit also includes the relative position information of words and the current reference position.

Concretely, the preset characteristic template includes the number, semantic features of the obtained words, the preset requirements needed to be satisfied by the relative positional relation of the obtained words and current reference position, extracting characteristic units from sentences based on the preset characteristic template may concretely include:

Separately using the position of each word in sentences after word segmentation processing as current reference position, determining the word whose relative positional relation between the position in the mentioned sentences and the current reference position satisfies the requirements of the mentioned characteristic template, generate the characteristic unit according to the semantic feature of the word whose mentioned relative positional relation satisfies the requirements of the mentioned characteristic template and the information of relative positional relation, the mentioned characteristic unit also includes the relative positional relation between words and the current reference position.

Through the characteristic template containing the requirements of relative positional relation, the association between words can be determined, and then the characteristic unit extracted based on the mentioned characteristic template contains the association between words, the mentioned association generally has relationship with punctuation status, therefore the language model established according to the weight relation between the mentioned characteristic unit and each kind of punctuation status can reflect the relation between the information contained in sentences and punctuation status more correctly, and then using the mentioned language model can improve the accuracy of punctuation adding.

According to the number of the obtained words required by the preset characteristic template, the preset characteristic template can include single word template and/or multi-word template.

Among which, the mentioned single word template includes obtaining the single word whose relative position relationship with the current reference position satisfies preset requirements, and semantic feature of the mentioned single word.

According to that when single word template extracts characteristic unit from sentences, respectively taking position of each word of the mentioned sentence as the mentioned current reference position, determining the single word whose relative position relationship with the current reference position satisfies the requirements of the mentioned single word characteristic template based on characteristic template of the mentioned single word, and determining characteristic unit of the single word occurring in sentence to be processed based on semantic feature of the word. The characteristic unit of the mentioned single word includes the mentioned individual word, semantic feature of the mentioned individual word and relative position relationship of the mentioned individual word with the current reference position.

The mentioned multi-word template includes obtaining multiple words whose relative position relationship with the current reference position satisfies preset requirements respectively, and semantic features of each word in the mentioned multiple words.

According to that when multi-word template extracts characteristic unit from sentences, respectively taking position of each word of the mentioned sentence as the mentioned current reference position, determining the multiple words whose relative position relationship with the current reference position satisfies requirements of the relative position relationship of the mentioned multi-word characteristic template based on the mentioned multi-word characteristic template, and determining the multi-word characteristic units occurring in sentence to be processed based on semantic features of each word of multiple words, and the mentioned multi-word characteristic units include the mentioned multiple words, semantic features of each word in mentioned multiple words and relative position relationship of the each word with the current reference position.

Among which, through modifying the requirements of the relative positional relation with current reference position in single word template, different kinds of single word template can be obtained, for example, the single word template is configured to obtain the word of current reference position and its semantic feature (may be recorded as template T00), the single word template is configured to obtain the word on the previous position of current reference position and its semantic feature (may be recorded as template T01), the single word template is configured to obtain the word on the latter position of current reference position and its semantic feature (may be recorded as template T02).

Through modifying the requirements of the relative positional relation with current reference position in multi-word template, different kinds of multi-word template can also be obtained, for example, the multi-word template is configured to obtain the word on the previous position of current reference position, the word of current reference position, the word on the latter position of current reference position and its semantic feature (may be recorded as template T05), the multi-word template is configured to obtain the word on the previous two position of current reference position, the word of the current reference position and its semantic feature (may be recorded as template T06).

The more words a multi-word template requires to obtain, the stronger the association among words is, and then the higher the accuracy of using the established language model to add punctuation is, the more the kinds of templates are, the more comprehensive the consideration of the association between the semantic feature and punctuation status occurring in sentences is, and then the higher the accuracy of using the established language model to add punctuation is. Of course, the more the kinds of templates are, the more words a multi-word template requires to obtain, the bigger the amount of calculation required by establishing language model is, the bigger the scale of the mentioned language model is, the bigger the information processing load of using the established language model to add punctuation is.

In Step 205, when determining the weight of each kind of punctuation status of each characteristic unit based on occurrence number of each kind of punctuation status of each characteristic unit, for the purpose of easy operation, each characteristic unit should be assigned identification (ID), the established language model including characteristic unit ID, characteristic unit corresponding to this ID, and weight information on each kind of the punctuation status of the mentioned characteristic unit.

In the present invention, semantic feature of a word can include but are not limited to part of speech and/or sentence constituent of the word in the current sentence.

The following content gives one specific example, introducing for demonstration the method of establishing a language model shown in FIG. 2.

In this example, assuming that the following Chinese sentence is included in the text corpus: 今天天气不错，我们下午去打球，然后去吃饭 (English meaning: Today's weather is pretty good, let's go to play basketball this afternoon and then go to have dinner).

When using method shown in FIG. 2 to establish language model, the following steps shall be performed:

Step 1, word segmentation of the mentioned sentence shall be performed.

After word segmentation of the sentence "今天天气不错，我们下午去打 球，然后去吃饭" is completed, the obtained words include: 今天 (today), 天气 (weather), 不错 (pretty good), 我们 (let us), 下午 (this afternoon), 去 (go to), 打球 (play basketball), 然后 (and then), 去 (go to), 吃饭 (have dinner).

Step 2, label semantic feature and punctuation status of each word in the sentence after word segmentation.

For demonstration, the mentioned semantic features include part of speech and sentence constituent, and therefore, refer to Table 1 for label result of the mentioned sentence:

from the mentioned sentence, distribute ID for extracted characteristic unit, and record occurrence number of each kind of punctuation status of each characteristic unit, wherein the mentioned characteristic unit including word and semantic feature of the word.

In this step, assuming that the preset characteristic templates include single word templates of T00, T01, T02 and multi-word template T05, single word template T00 is used for obtaining words and their semantic features in the current reference position, single word template T01 is used for obtaining words and their semantic features in the position prior to the current reference position, single word template T02 is used for obtaining words and their semantic features in the position after the current reference position, multi-word template T05 is used for obtaining words and their semantic features in the position prior to the current reference position, the current reference position, the position after the current reference position respectively.

Taking the position of labeled sentence in Step 2 as the current position, extract characteristic units based on single word templates of T00, T01, T02 and multi-word template T05.

For example, when taking the location of "天气 (weather)" as the current reference position, the obtained characteristic unit based on template T00 includes "今天 (today)" and semantic feature of "今天 (today)" (namely, noun and adverbial modifier), the obtained characteristic unit based on template T01 includes "天气 (weather)" and semantic feature of "天气 (weather)" (namely noun and subject), the obtained characteristic unit based on template T02 includes "bu cuo" and semantic feature of "bu cuo" (namely adjective and predicate), the obtained characteristic unit based on template T05 includes "今天 (today)" and semantic feature of "今天 (today)" (namely, noun and adverbial modifier), "天气 (weather)" and semantic feature of "天气 (weather)" (namely noun and subject), "bu cuo" and semantic feature of "bu cuo" (namely adjective and predicate).

Among which, information about relative position of each word in characteristic unit and the current reference position can be stored in characteristic unit explicitly, or implicitly by the way of assigning ID in corresponding range for characteristic unit according to ID range corresponding to each kind of template.

When extracting characteristic unit based on characteristic template, if there is no word in certain relative position characteristic template requires, then present none of word in the agreed method, for example, using agreed character or character string to present none of word. For example, there is no word in front of "今天 (today)" in the mentioned sentence, the position of "今天 (today)" shall be taken as the current reference position, when extracting characteristic unit based on characteristic templates of T00 or T05, it is

TABLE 1

| Content | 今天 (today) | 天气 (weather) | 不错 (pretty good) | 我们 (let us) | 下午 (this afternoon) | 去 (go to) | 打球 (play basketball) | 然后 (and then) | 去 (go to) | 吃饭 (have dinner) |
|---|---|---|---|---|---|---|---|---|---|---|
| Part of speech | Noun | Noun | Adjective | Pronoun | Noun | Verb | Noun | Adverb | Verb | Noun |
| Constituent | Adverbial modifier | Subject | Predicate | Subject | Adverbial modifier | Predicate | Adverbial modifier | Adverbial modifier | Predicate | Object |
| Punctuation | None | None | Comma | None | None | None | Comma | None | None | Period |

Step 3, according to label result in Step 2, and based on the preset characteristic template, extract characteristic unit required to use the agreed method to present that there is no word in the previous position of "今天 (today)".

After characteristic unit is extracted, characteristic unit with different content can be differentiated by assigning different IDs for characteristic units. There are various methods to assign the mentioned ID, for example, it is acceptable to take the generated Hash Value based on content of characteristic unit as ID of the mentioned characteristic unit.

For each characteristic unit, every time the mentioned characteristic unit appears in sentence of corpus, record occurrence number of punctuation status of the characteristic unit according to punctuation status of each word appearing in the characteristic unit this time. Among which, punctuation status of characteristic unit includes punctuation status of each word in characteristic unit, in other words, when characteristic unit includes multiple words, punctuation status of characteristic unit consists of the combination of punctuation status of the mentioned multiple words, wherein, when punctuation status of any one of words changes, punctuation status of mentioned characteristic unit containing multiple words will also change. For example, one characteristic unit includes three words, when punctuation statuses of three words are "none", "none" and "comma" respectively, punctuation status of this characteristic unit is a combination of "none", "none" and "comma", when punctuation status of the third word changes into "none", then punctuation status of this characteristic unit changes into another kind of punctuation status, namely, it is "none", "none" and "none".

As shown in Step 2 and 3, advantage of the adoption of word segmentation processing instead of hyphenation processing by the present invention is that: only words have specific semantic features, while single character generally fails to have specific semantic feature, and therefore word segmentation also makes preparation for Step 2; in addition, as during the process of characteristic extraction, context information contained in sentence will be frequently involved, and context of word is still the word, relation of semantic feature can be presented more specifically by relationship among words, and interrelated semantic features have a relatively strong relationship with punctuation statuses, and thus, characteristic unit, which is extracted based on word segmentation and context relationship after word segmentation, enables to extract more accurately relationship between semantic information and punctuation status contained in sentence.

Step 4, according to characteristic unit Step 3 extracts, and the occurrence number of each kind of punctuation status of characteristic unit, determining the weight of each kind of punctuation state of each characteristic unit, establishing the language model which includes the correspondence of the weight of each characteristic unit and each kind of punctuation status of its own.

Among which, specifically, iterative optimization algorithm can be used to determine the weight of each kind of punctuation status in each one of characteristic units.

Among which, many iterative optimization algorithms can be used, for example, Newton iterative algorithm, BFGS (Large-scale Bound-constrained Optimization) iterative algorithm, L-BFGS (Software for Large-scale Bound-constrained Optimization) iterative algorithm, OWL-QN (Orthant-Wise Limited-memory Quasi-Newton) iterative algorithm, etc. Preferably, L-BFGS iterative algorithm shall be used, for the reason that L-BFGS iterative algorithm has the advantage of speedy iteration and can improve speed of establishing language model.

The language model, which is established finally based on the mentioned Step 1-Step 4, includes correspondence of the weight of each characteristic unit and each kind of punctuation status of its own, and wherein each characteristic unit also has an ID which can distinguish it from other characteristic units, and the correspondence of the weight of the mentioned characteristic unit and each kind of punctuation status of its own can be retrieved by the mentioned ID.

Figure 3:
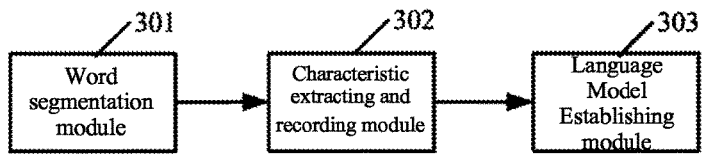
FIG. 3 is a structural diagram of the establishment device of language model used for adding punctuation according to some embodiments.

Based on the method of establishing language model shown in FIG. 1, the present invention also provides a kind of device of establishing language model, and refers to FIG. 3 for more information.

FIG. 3 is the structural diagram of the establishment device of language model used for adding punctuation according to some embodiments.

As shown in FIG. 3, this device includes word segmentation module 301, characteristic extraction and recording module 302, establishing module 303.

Word segmentation module 301, is used to conduct word segmentation processing for the sentences in corpus, and wherein, the sentences in corpus have been added punctuation in advance.

Characteristic extraction and recording module 302, according to the semantic feature of each word in the sentences after word processing segmentation, and relying on the preset characteristic template, are configured to search for the characteristic unit occurring in the mentioned corpus, and to record the occurrence number of each kind of punctuation status of each characteristic unit in the mentioned corpus according to the punctuation status after each word in characteristic unit.

Establishing module 303, according to the occurrence number of each kind of punctuation status of each characteristic unit, is configured to determine the weight of each kind of punctuation status of each characteristic unit, and to establish the language model which includes the correspondence of the weight of each characteristic unit and each kind of punctuation status of its own.

In which, the mentioned language model is used for providing the correspondence of the weight of each characteristic unit and each kind of punctuation status of its own in the mentioned language model according to the search request when searching out the characteristic unit from the sentences short of punctuation, so as to depend on the mentioned correspondence to add punctuation to the sentences short of punctuation.

The device shown in FIG. 3 can also include label module further.

The mentioned label module, according to the semantic information of each word in the mentioned sentence after word segmentation processing of sentence, is configured to label semantic feature for each one of the mentioned words, and to label punctuation status for each one of the mentioned words according to the punctuation status information after each one of the mentioned words in the mentioned sentence.

Characteristic extraction and recording module 302, according to the mentioned semantic feature of each word, are configured to generate characteristic units based on preset characteristic template, the mentioned characteristic template including the number, semantic features of the obtained words, the mentioned characteristic unit including words and semantic features of words, and to search for each characteristic unit from sentences of the mentioned corpus, to record the punctuation status of the characteristic unit when each characteristic unit occurring, recording the occurrence number of each kind of punctuation status of this characteristic unit, among which, the punctuation status of the characteristic unit includes the punctuation status of each word in this characteristic unit.

The mentioned preset characteristic template also can include that obtaining the word whose relative position relationship with the current reference position satisfies preset requirements.

Characteristic extraction and recording module 302, taking each one of words in sentence after word segmentation processing as the current reference position respectively, are configured to determine the word whose relative position relationship with the current reference position in mentioned sentence satisfies the requirements of the mentioned characteristic template, and to generate the characteristic unit based on semantic feature of the word whose mentioned relative position relationship satisfies requirements of characteristic template and relative position relationship information, and the mentioned characteristic unit also includes relative position relationship of the word with the current reference position.

The mentioned preset characteristic template can include single word template, and the mentioned single word template includes obtaining the word whose relative position relationship with the current reference position satisfies preset requirements, and semantic feature of the mentioned single word.

Characteristic extraction and recording module 302, taking position of each word of the mentioned sentence as the mentioned current reference position respectively, are configured to determine the single word whose relative position relationship with the current reference position satisfies requirements of characteristic template of the mentioned single word, determine characteristic unit of the single word occurring in sentence to be processed based on semantic feature of the single word, and characteristic unit of the mentioned single word includes the mentioned individual word, semantic feature of the mentioned individual word and relative position relationship of the mentioned individual word with the current reference position.

And/or, the mentioned preset characteristic template can include multi-word template, and the mentioned multi-word template includes obtaining multiple words whose relative position relationship with the current reference position satisfies preset requirements respectively, and semantic feature of each word of the mentioned multiple words.

Characteristic extraction and recording module 302, taking position of each word of the mentioned sentence as the mentioned current reference position respectively, are configured to determine the multiple words whose relative position relationship with the current reference position satisfies requirements of the relative position relationship of the mentioned multi-word characteristic template based on the mentioned multi-word characteristic template, and to determine the multi-word characteristic units occurring in sentence to be processed based on semantic feature of each word of the multiple words, and the mentioned multi-word characteristic units include the mentioned multiple words, semantic feature of the individual word of mentioned multiple words, and relative position relationship of position of the individual word with the mentioned current reference position.

After language model, mentioned in the present invention, which is used for adding punctuations is established, punctuations of the sentence to be processed can be added based on the mentioned language model, and the following content gives a specific introduction about the method and system of adding punctuations with reference to attached drawings 4 and attached drawings 5.

Wherein language model, configured to add punctuations in the present invention, includes correspondence of the weight of each characteristic unit and each kind of punctuation status of its own, and provides correspondence of the weight of corresponding characteristic unit and each kind of punctuation status of its own according to search request, and the present invention has no limit on the mentioned method of adding punctuation and the specific method of establishing the mentioned language model used for adding punctuation by the system.

Figure 4:
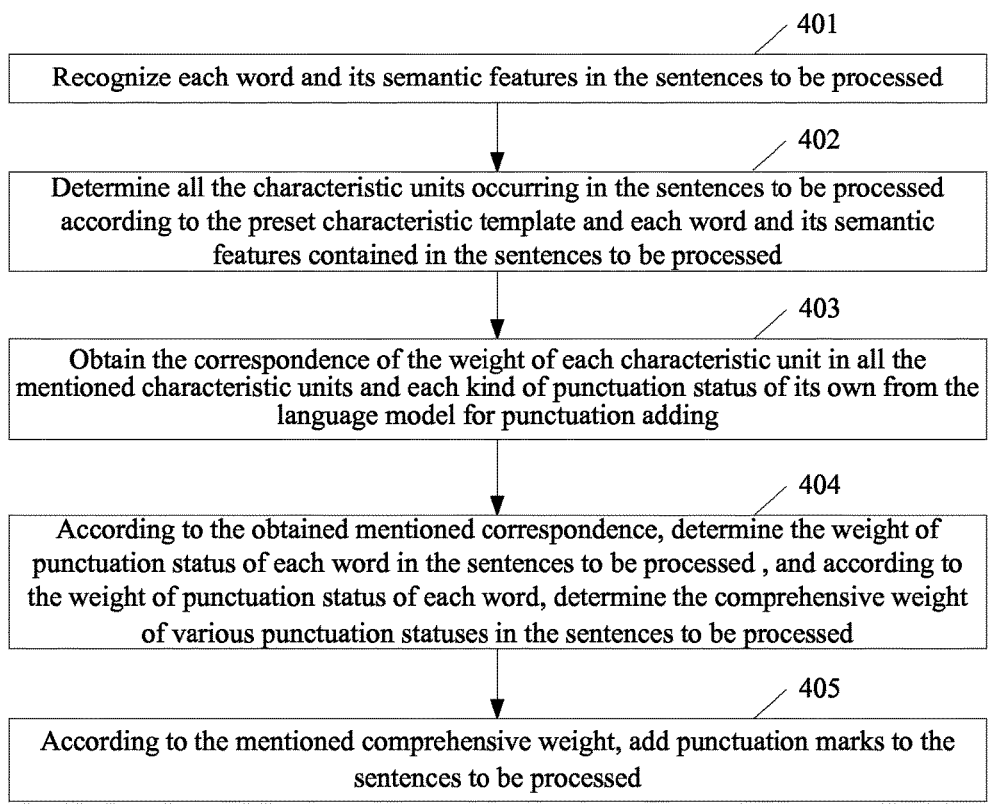
FIG. 4 is a flowchart diagram of adding punctuation method according to some embodiments.

FIG. 4 is the flowchart diagram of adding punctuation method according to some embodiments.

As is shown in FIG. 4, the method includes:

Step 401, recognizing each word and its semantic features in the sentences to be processed.

Step 402, according to the preset characteristic template and each word and its semantic features contained in the sentences to be processed, determining all the characteristic units occurring in the sentences to be processed.

Among which, the mentioned characteristic template includes the number, semantic features of the obtained words, the mentioned characteristic unit includes words and semantic features of words.

Step 403, obtaining the correspondence of the weight of each characteristic unit in all the mentioned characteristic units and each kind of punctuation status of its own from the language model for punctuation adding.

Step 404, determining the weight of punctuation status of each word in the sentences to be processed according to the obtained mentioned correspondence, and determine the comprehensive weight of various punctuation statuses in the sentences to be processed according to the weight of punctuation status of each word.

Among which, each punctuation status in the sentences to be processes includes the punctuation status of each word contained in the sentences to be processed.

Step 405, adding punctuations to the sentences to be processed according to the mentioned comprehensive weight.

In this step, selecting out the punctuation status of the sentences to be processed with the largest comprehensive weight, and adding punctuations to the sentences to be processed according to the selected punctuation status.

Among which, in Step 404, the weight of the punctuation status of each word in the sentences to be processed can be determined according to the correspondence of the weight of the obtained characteristic unit and each kind of punctuation status of its own. Many kinds of methods can be adopted to determine the weight of punctuation status of each word in the sentences to be processed concretely, the present invention does not limit it. For example, the weight of punctuation status of each word in the sentences to be processed can be determined according to the mentioned correspondence by the method of mapping function, concretely, for the words in the current position in the sentences to be processed, determine all the characteristic units that contain the words in the current position, and obtain the correspondence of the weight of each characteristic unit in them and each kind of punctuation status of the characteristic unit itself, according to the mapping function to determine the weight of various punctuation statuses of the words in the mentioned position. Among which, when the words with the same content is located at different positions in the sentences to be processed, they are regarded as different words, thus, their characteristic units are different, as well as their punctuation statuses.

In Step 404, the punctuation status of mentioned sentences to be processed includes the punctuation status of each word in the sentences to be processed, which is equivalent to the combination of the punctuation status of all words in the sentences to be processed, thus the comprehensive weight of various punctuation statuses in the sentences to be processed can be determined by the optimal path algorithm, such as determine the optimal combination way of the punctuation statuses of all words in the sentences to be processed by Viterbi algorithm, i.e. determine the optimal path, and the comprehensive weight of the optimal combination way is the highest.

In the method shown in FIG. 4, the mentioned template can also include obtaining the words whose relative position relationship with the current reference position satisfies preset requirements, the mentioned characteristic unit also includes the relative positional relation between words and the current reference position.

The mentioned determination of all the characteristic units occurring in the sentences to be processed includes:

Respectively taking the position of each word in the sentences to be processed as the current reference position, determining the words whose relative position relationship with the current reference position satisfies the requirements of the mentioned characteristic template according to the mentioned characteristic template, and determining the characteristic unit occurring in the sentences to be processed according to the semantic features of the word.

The mentioned preset characteristic template can include single word template, and the mentioned single word template includes obtaining the word whose relative position relationship with the current reference position satisfies preset requirements, and semantic feature of the mentioned single word.

The mentioned determination of all the characteristic units occurring in the sentences to be processed includes:

Respectively taking the position of each word in the sentences to be processed as the current reference position, are configured to determine the single word whose relative position relationship with the current reference position satisfies requirements of characteristic template of the mentioned single word, determine characteristic unit of the single word occurring in sentence to be processed based on semantic feature of the single word, and characteristic unit of the mentioned single word includes the mentioned individual word, semantic feature of the mentioned individual word and relative position relationship of the mentioned individual word with the current reference position.

And/or, the mentioned preset characteristic template can include multi-word template, and the mentioned multi-word template includes obtaining multiple words whose relative position relationship with the current reference position satisfies preset requirements respectively, and semantic feature of each word of the mentioned multiple words.

The mentioned determination of all the characteristic units occurring in the sentences to be processed includes:

Respectively taking the position of each word in the sentences to be processed as the current reference position, are configured to determine the multiple words whose relative position relationship with the current reference position satisfies requirements of the relative position relationship of the mentioned multi-word characteristic template based on the mentioned multi-word characteristic template, and to determine the multi-word characteristic units occurring in sentence to be processed based on semantic feature of each word of the multiple words, and the mentioned multi-word characteristic units include the mentioned multiple words, semantic feature of the individual word of mentioned multiple words, and relative position relationship of position of the individual word with the mentioned current reference position.

In the method shown in FIG. 4, when obtaining the correspondence of the weight of each characteristic unit in all mentioned characteristic units and each kind of punctuation status of its own from the language model for punctuation adding, the search request with identification (ID) of characteristic unit can be sent to the language engine for punctuation adding, obtaining the correspondence of weight of corresponding characteristic unit and each kind of punctuation status of its own from the mentioned language model for punctuation adding according to the ID of mentioned characteristic unit, wherein, there is an ID of characteristic unit, a characteristic unit corresponding to the ID, and the correspondence of weight of the characteristic unit and each kind of punctuation status of its own in the storage of the mentioned language model for punctuation adding.

Among which, the sentences to be processed mentioned in the present invention can not only be the sentences of text type and being lack of punctuations, but also the sentences of speech type.

Figure 5:
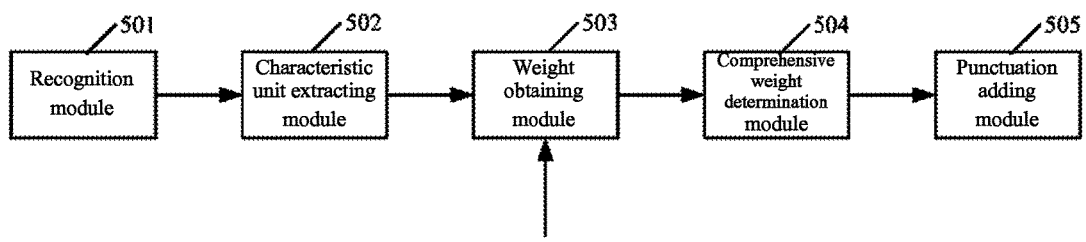
FIG. 5 is a composition schematic diagram of adding punctuation system according to some embodiments.

FIG. 5 is the composition schematic diagram of adding punctuation system according to some embodiments.

As is shown in FIG. 5, the system includes recognition device 501, characteristic unit extracting device 502, weight obtaining device 503, comprehensive weight determination device 504 and the punctuation adding device 505.

Recognition device 501, configured to recognize each word and its semantic features in the sentences to be processed.

Characteristic unit extracting device 502, configured to determine all the characteristic units occurring in the sentences to be processed according to the preset characteristic template and each word and its semantic features contained in the sentences to be processed, wherein, the mentioned characteristic template includes the number, semantic features of the obtained words, the mentioned characteristic unit includes words and their semantic features.

Weight obtaining device 503, configured to obtain the correspondence of the weight of each characteristic unit in all the mentioned characteristic units and each kind of punctuation status of its own from the language model for punctuation adding.

Comprehensive weight determination device 504, configured to determine the weight of punctuation status of each characteristic unit in the sentences to be processed according to the obtained mentioned correspondence, and determine the comprehensive weight of each kind of punctuation status of sentences to be processed according to the weight of punctuation status of each characteristic unit, wherein, each punctuation status of the sentences to be processed includes the punctuation status of each word contained in the sentence to be processed.

Punctuation adding device 505, configured to add punctuations to the sentences to be processed according to the mentioned comprehensive weight.

The mentioned characteristic template can also include obtaining the words whose relative position relationship with the current reference position satisfies preset requirements; the mentioned characteristic unit also includes the relative position relationship between words and the current reference position.

Characteristic extracting device 502, configured to take the position of each word in the sentences to be processed as the current reference position respectively, determine the words whose relative position relationship with the current reference position satisfies the requirements of the mentioned characteristic template according to the mentioned characteristic template, and determine the characteristic unit occurring in the sentences to be processed according to the semantic features of the word.

The mentioned preset characteristic template can include single word template, and the mentioned single word template includes obtaining the word whose relative position relationship with the current reference position satisfies preset requirements, and semantic feature of the mentioned single word.

Characteristic extracting device 502, configured to take the position of each word in the sentences to be processed as the current reference position respectively, are configured to determine the single word whose relative position relationship with the current reference position satisfies requirements of characteristic template of the mentioned single word, determine characteristic unit of the single word occurring in sentence to be processed based on semantic feature of the single word, and characteristic unit of the mentioned single word includes the mentioned individual word, semantic feature of the mentioned individual word and relative position relationship of the mentioned individual word with the current reference position.

And/or, the mentioned preset characteristic template can include multi-word template, and the mentioned multi-word template includes obtaining multiple words whose relative position relationship with the current reference position satisfies preset requirements respectively, and semantic feature of each word of the mentioned multiple words.

Characteristic extracting device 502, configured to take the position of each word in the sentences to be processed as the current reference position respectively, are configured to determine the multiple words whose relative position relationship with the current reference position satisfies requirements of the relative position relationship of the mentioned multi-word characteristic template based on the mentioned multi-word characteristic template, and to determine the multi-word characteristic units occurring in sentence to be processed based on semantic feature of each word of the multiple words, and the mentioned multi-word characteristic units include the multiple words, semantic feature of the individual word, and relative position relationship of position of the individual word with the mentioned current reference position.

Weight obtaining device 503, configured to send search request with identification (ID) of characteristic unit to the language model for punctuation adding, obtain the correspondence of weight of corresponding characteristic unit and each kind of punctuation status of its own from the mentioned language model for punctuation adding according to the ID of mentioned characteristic unit, wherein, there is an ID of characteristic unit, a characteristic unit corresponding to the ID, and the correspondence of weight of the characteristic unit and each kind of punctuation status of its own in the storage of the mentioned language model for punctuation adding.

Among which, the sentences to be processed can not only be the sentences of text type and being lack of punctuations, but also the sentences of speech type. When the sentence to be processed is the sentence of speech type, the recognition device 501 includes speech recognition engine, the mentioned speech recognition engine can recognize the words contained in the sentences of speech type and the semantic features of each word according to the acoustic model, dictionary and the language model which is used for recognizing the semantic features of sentences.

Figure 6:
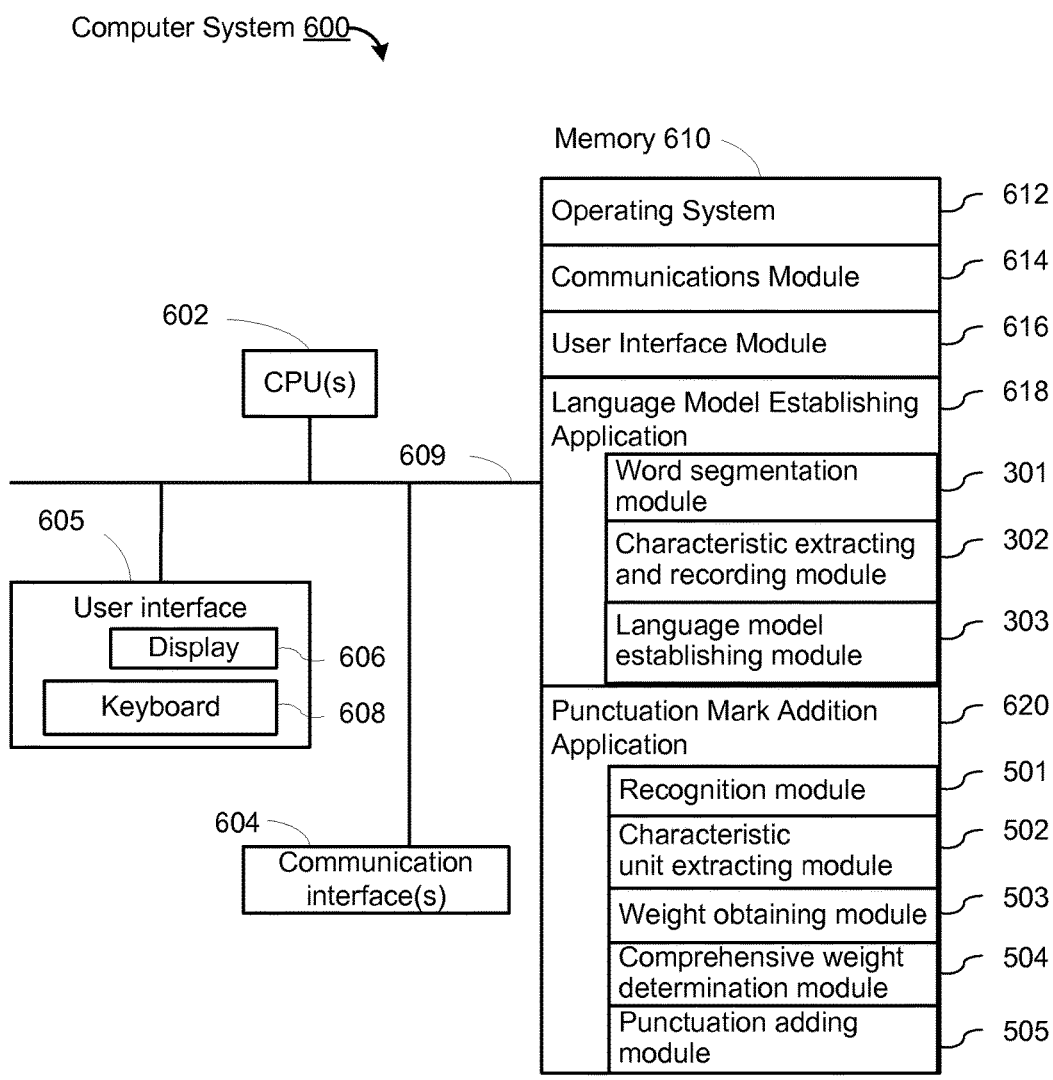
FIG. 6 is a block diagram illustrative of the components of a computer system in accordance with some embodiments Like reference numerals refer to corresponding parts throughout the several views of the drawings.

FIG. 6 is a block diagram illustrative of the components of a computer system 3 in accordance with some embodiments. The computer system 600 typically includes one or more processing units (CPU's) 602, one or more network or other communications interfaces 604, memory 610, and one or more communication buses 609 for interconnecting these components. The communication buses 609 may include circuitry (sometimes called a chipset) that interconnects and controls communications between system components. The computer system 600 may include a user input device 605, for instance, a display 606 and a keyboard 608. Memory 610 may include high speed random access memory and may also include non-volatile memory, such as one or more magnetic disk storage devices. Memory 610 may include mass storage that is remotely located from the CPU's 602. In some embodiments, memory 602, or alternately the non-volatile memory device(s) within memory 602, comprises a non-transitory computer readable storage medium. Memory 602 or the computer readable storage medium of memory 602 stores the following elements, or a subset of these elements, and may also include additional elements:

- an operating system 612 that includes procedures for handling various basic system services and for performing hardware dependent tasks;
- a network communication module 614 that is used for connecting the computer system 600 to a remote computer (e.g., a on-line chat server) or other computers via one or more communication networks (wired or wireless), such as the Internet, other wide area networks, local area networks, metropolitan area networks, and so on;
- a user interface module 616 configured to receive user inputs through the user interface 605;
- a language model establishing application 618 for establishing a language model using training information content; in some embodiments, the language model establishing application 618 further including:
  - a word segmentation module 301 as described above in connection with FIGS. 1-3;
  - a characteristic extracting and recording module 302 as described above in connection with FIGS. 1-3; and
  - a language model establishing module 303 as described above in connection with FIGS. 1-3;
- a punctuation mark addition application 620 for adding punctuation marks to information content based on a language model; in some embodiments, the punctuation mark addition application 620 further including:
  - a recognition module 501 as described above in connection with FIGS. 4-5;
  - a characteristic unit extracting module 502 as described above in connection with FIGS. 4-5;
  - a weight obtaining module 503 as described above in connection with FIGS. 4-5;
  - a comprehensive weight determination module 504 as described above in connection with FIGS. 4-5; and
  - a punctuation adding module 505 as described above in connection with FIGS. 4-5.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of adding punctuation marks to a Chinese sentence based on a Chinese language punctuation model, wherein the Chinese language punctuation model was pre-generated from a training corpus of Chinese sentences having punctuation marks and includes multiple predefined characteristic units, each predefined characteristic unit including a series of Chinese expressions, possible punctuation marks present in the series of Chinese expressions and their respective probabilities, the method comprising:

at a computer having one or more processors and memory for storing programs to be executed by the one or more processors:

extracting the Chinese sentence from a speech input through speech recognition;

identifying a plurality of expressions in the Chinese sentence by segmenting the Chinese sentence according to their semantic features, each of the plurality of expressions including one or more Chinese characters;

grouping the plurality of expressions in the Chinese sentence into a plurality of characteristic units according to the semantic features of the plurality of expressions using one or more predefined characteristic templates;

extracting, from the Chinese language punctuation model, a plurality of possible punctuation marks appearing in the corresponding series of Chinese expressions and their respective probabilities for each of the plurality of characteristic units;

determining a punctuation mark and its weight for each of the plurality of expressions in the Chinese sentence according to the plurality of possible punctuation marks extracted from the Chinese language punctuation model;

calculating an overall weight for each possible arrangement of punctuation marks in the Chinese sentence based on the weights of punctuation marks at each of the plurality of expressions in the Chinese sentence; and adding the punctuation marks corresponding to an arrangement of a maximum overall weight into the Chinese sentence.

2. The method of claim 1, wherein the plurality of probabilities are determined according to one method selected from the group consisting of a Newton's method, a conventional Broyden-Fletcher-Goldfarb-Shanno (BFGS) method, a limited-memory (L-BFGS) method, and a quasi-Newton method.

3. The method of claim 1, wherein each characteristic unit defines, for each of the corresponding series of Chinese expressions, a respective position in the Chinese sentence and a respective relative position of at least one other expression in the series of Chinese expressions.

4. The method of claim 1, wherein the series of Chinese expressions associated with a respective characteristic unit only include a single Chinese expression, and the corresponding characteristic unit defines a position of the single Chinese expression in the Chinese sentence and semantic features of the single Chinese expression.

5. The method of claim 1, wherein the semantic features of a respective characteristic unit are determined based on at least one of semantic properties, syntactic properties and grammatical category of the corresponding series of Chinese expressions.

6. The method of claim 1, wherein grouping the plurality of Chinese expressions into a plurality of characteristic units according to the semantic features of the plurality of expressions using one or more predefined characteristic templates further comprises:

determining the semantic features of each of the plurality of Chinese expressions based on a meaning of the respective expression in the Chinese sentence;

identifying a punctuation state for each expression in the plurality of Chinese expressions; and in accordance with the predefined characteristic templates, determining the plurality of characteristic units based on the semantic features and the punctuation state of each of the plurality of Chinese expressions, each predefined characteristic template further defining a number of Chinese expressions in a corresponding characteristic unit.

7. A computer-implemented method of establishing a Chinese language punctuation model from a training corpus of Chinese sentences having a plurality of punctuation marks, comprising:
   at a computer having one or more processors and memory for storing programs to be executed by the one or more processors:
   identifying, within the training corpus of Chinese sentences having the plurality of punctuation marks, a plurality of expressions, each of the plurality of expressions including one or more Chinese characters, wherein the plurality of expressions are separated and grouped by a plurality of punctuation marks that are located at predetermined locations in the training corpus of Chinese sentences;
   grouping the plurality of expressions in the training corpus of Chinese sentences into a plurality of characteristic units according to semantic features of the plurality of expressions and predefined characteristic templates of the plurality of characteristic units, each characteristic unit including a respective series of expressions and a unique identification number assigned to the characteristic unit; and
   for each of the plurality of characteristic units,
      recording a respective frequency of occurrence for each of the plurality of punctuation marks appearing in the corresponding series of expressions found in the training corpus of Chinese sentences; and
   wherein a plurality of probabilities for a plurality of punctuation marks associated with each of the plurality of characteristic units are used to determine a punctuation mark for a corresponding characteristic unit found in a Chinese sentence extracted from a speech input through speech recognition and that is not yet segmented by punctuation marks;
   determining a punctuation mark and its weight for each of a plurality of expressions in a Chinese sentence according to a plurality of possible punctuation marks extracted from the Chinese language punctuation model;
   calculating an overall weight for each possible arrangement of punctuation marks in the Chinese sentence based on the weights of punctuation marks at each of the plurality of expressions in the Chinese sentence; and
   adding the punctuation marks corresponding to an arrangement of a maximum overall weight into the Chinese sentence.

8. The method of claim 7, wherein grouping the plurality of expressions in the training corpus of Chinese sentences into a plurality of characteristic units further comprises:
   determining the semantic features of each of the plurality of Chinese expressions based on a meaning of the respective expression within a corresponding Chinese sentence;
   identifying a punctuation state for each of the plurality of Chinese expressions; and
   in accordance with the predefined characteristic templates, determining the plurality of characteristic units based on the semantic features and the punctuation state of each of the plurality of Chinese expressions, each predefined characteristic template further defining a number of Chinese expressions in a corresponding characteristic unit.

9. The method of claim 7, wherein recording the respective frequency of occurrence for each of the plurality of punctuation marks appearing in the corresponding series of expressions found in the training corpus of Chinese sentences further comprises:
   searching for each of the plurality of characteristic units in the training corpus of Chinese sentences; and
   when a respective characteristic unit is identified, defining a punctuation state for the respective characteristic unit, wherein the punctuation state comprises a subset of punctuation states for the series of expressions included in the respective characteristic unit; and
   in accordance with the punctuation state, updating the respective frequency of occurrence for the respective characteristic unit.

10. The method of claim 7, wherein each characteristic unit defines, for each of the corresponding series of Chinese expressions, a respective position in the training corpus of Chinese sentences, and a relative position of at least one other expression in the series of Chinese expressions.

11. The method of claim 7, wherein the series of Chinese expressions associated with a characteristic unit only includes a single Chinese expression, and the corresponding characteristic unit defines a position of the single Chinese expression in the training corpus of Chinese sentences and semantic features of the single Chinese expression.

12. The method of claim 7, wherein the semantic features of a respective characteristic unit are determined based on at least one of semantic properties, syntactic properties and grammatical category of the corresponding series of Chinese expressions.

13. The method of claim 7, wherein in the language model, the plurality of probabilities are determined according to one method selected from a group that consists of a Newton's method, a conventional Broyden-Fletcher-Goldfarb-Shanno (BFGS) method, a limited-memory (L-BFGS) method, and a quasi-Newton method.

14. A computer system, comprising:
   one or more processors; and
   memory having instructions and a Chinese language punctuation model stored thereon, wherein the Chinese language punctuation model was pre-generated from a training corpus of Chinese sentences having punctuation marks and includes multiple predefined characteristic units, each predefined characteristic unit including a series of Chinese expressions, possible punctuation marks present in the series of Chinese expressions and their respective probabilities, the instructions when executed by the one or more processors cause the processors to perform operations, comprising:
   extracting a Chinese sentence from a speech input through speech recognition;
   identifying a plurality of expressions in the Chinese sentence by segmenting the Chinese sentence according to their semantic features, each of the plurality of expressions including one or more Chinese characters;
   grouping the plurality of expressions in the Chinese sentence into a plurality of characteristic units according to the semantic features of the plurality of expressions using one or more predefined characteristic templates;
   extracting, from the Chinese language punctuation model, a plurality of possible punctuation marks appearing in the corresponding series of Chinese expressions and their respective probabilities for each of the plurality of characteristic units;
   determining a punctuation mark and its weight for each of the plurality of expressions in the Chinese sentence according to the plurality of possible punctuation marks extracted from the Chinese language punctuation model;

calculating an overall weight for each possible arrangement of punctuation marks in the Chinese sentence based on the weights of punctuation marks at each of the plurality of expressions in the Chinese sentence; and adding the punctuation marks corresponding to an arrangement of a maximum overall weight into the Chinese sentence.

15. The computer system of claim 14, wherein in the language model, the plurality of probabilities are determined according to one method selected from a group that consists of a Newton's method, a conventional Broyden-Fletcher-Goldfarb-Shanno (BFGS) method, a limited-memory (L-BFGS) method, and a quasi-Newton method.

16. The computer system of claim 14, wherein each characteristic unit defines, for each of the corresponding series of Chinese expressions, a respective position in the Chinese sentence and a respective relative position of at least one other expression in the series of Chinese expressions.

\* \* \* \* \*